US012754728B2

(12) United States Patent
Pu et al.

(10) Patent No.: US 12,754,728 B2
(45) Date of Patent: Oct. 6, 2026

(54) SERVERLESS INFRASTRUCTURE

(71) Applicant: INTERNATIONAL BUSINESS MACHINES CORPORATION, Armonk, NY (US)

(72) Inventors: Gang Pu, ShannXi (CN); Jin Chi He, Xian (CN); Hui Yu, Xi'an (CN); Yi Yang Hh Huang, Xian (CN); Jin Tang Cheng, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 18/244,409

(22) Filed: Sep. 11, 2023

(65) Prior Publication Data

US 2025/0085954 A1 Mar. 13, 2025

(51) Int. Cl.
*G06F 8/61* (2018.01)

(52) U.S. Cl.
CPC .................................... *G06F 8/63* (2013.01)

(58) Field of Classification Search
CPC .................................... G06F 8/60; G06F 8/63
See application file for complete search history.

(56) References Cited

U.S. PATENT DOCUMENTS 10,922,284 B1 * 2/2021 Venkatasubramanian .................. H04L 67/34
11,018,965 B1 * 5/2021 Ibryam .................. H04L 43/08
11,030,016 B2 6/2021 Banerjee et al.
11,301,562 B2 4/2022 Tiwary et al.
12,443,427 B1 * 10/2025 Kallakuri .............. G06F 9/4843
2014/0344663 A1 * 11/2014 Joel .......................... G06F 16/95 715/234
2019/0205186 A1 * 7/2019 Zhang ................... G06F 9/4843
2020/0081745 A1 3/2020 Cybulski et al.
2021/0124822 A1 4/2021 Tiwary et al.
2021/0184942 A1 6/2021 Tootaghaj et al.
2021/0409931 A1 * 12/2021 Arkko ..................... H04L 67/51
2022/0038355 A1 2/2022 Chen
2022/0253347 A1 8/2022 Jones et al.
2024/0103882 A1 * 3/2024 Scrivano ............. G06F 9/45533

OTHER PUBLICATIONS

Gadepalli et al., "Sledge: a Serverless-first, Light-weight Wasm Runtime for the Edge", https://dl.acm.org/doi/10.1145/3423211.3425680, Dec. 11, 2020; 15 Pages.
Solaiman et al., "WLEC: A Not So Cold Architecture to Mitigate Cold Start Problem in Serverless Computing", https://ieeexplore.ieee.org/document/9096489, May 19, 2020; 10 Pages.
Suo et al., "Tackling Cold Start of Serverless Applications by Efficient and Adaptive Container Runtime Reusing", https://ieeexplore.ieee.org/document/9556063, Oct. 13, 2021; 11 Pages.

(Continued)

*Primary Examiner* — Marina Lee
(74) *Attorney, Agent, or Firm* — Seed Intellectual Property Law Group LLP

(57) ABSTRACT

Embodiments receive a plurality of incoming requests, determine that the plurality of incoming requests comprise a plurality of instant requests, create a software image based on the instant requests, and pull the software image based on a deployed configuration.

20 Claims, 7 Drawing Sheets

(56) References Cited

OTHER PUBLICATIONS

Lee et al., “Mitigating Cold Start Problem in Serverless Computing with Function Fusion”, https://www.mdpi.com/1424-8220/21/24/8416, Dec. 16, 2021; 21 Pages.
Jia et al., “Nightcore: Efficient and Scalable Serverless Computing for Latency-Sensitive, Interactive Microservices”, https://dl.acm.org/doi/10.1145/3445814.3446701, Apr. 17, 2021; 15 Pages.
No Author, “WasmEdge in Kubernetes”, https://web.archive.org/web/20230530024948/https://wasmedge.org/book/en/use_cases/kubernetes.html, May 30, 2023, 3 pages.
Ostrowski et al., “Wasm vs. Docker: Performant, Secure, and Versatile Containers”, https://www.docker.com/blog/wasm-vs-docker/, May 9, 2024, 11 pages.

* cited by examiner

SERVERLESS INFRASTRUCTURE

BACKGROUND

Aspects of the present invention relate generally to serverless infrastructure and, more particularly, to serverless infrastructure efficiency improvement and reduced latency.

In serverless infrastructure, there is no need to continuously run applications all the time. Thus, applications on the serverless infrastructure may be scaled up or scaled down based on application demand.

SUMMARY

In a first aspect of the invention, there is a computer-implemented method including: receiving, by a processor set, a plurality of incoming requests, determining, by the processor set, that the plurality of incoming requests comprise a plurality of instant requests, creating, by the processor set, a software image based on the plurality of instant requests, and pulling, by the processor set, the software image based on a deployed configuration.

In another aspect of the invention, there is a computer program product including one or more computer readable storage media having program instructions collectively stored on the one or more computer readable storage media. The program instructions are executable to: receive a plurality of incoming requests; determine that the plurality of incoming requests comprise a plurality of continuous requests; create a service image based on the plurality of continuous requests; and pull the service image based on an instruction of pulling and running the service image.

In another aspect of the invention, there is a system including a processor set, one or more computer readable storage media, and program instructions collectively stored on the one or more computer readable storage media. The program instructions are executable to: receive a plurality of incoming requests, determine that the plurality of incoming requests comprise a plurality of instant requests, create a software image based on the plurality of instant requests, and pull the software image based on a deployed configuration.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
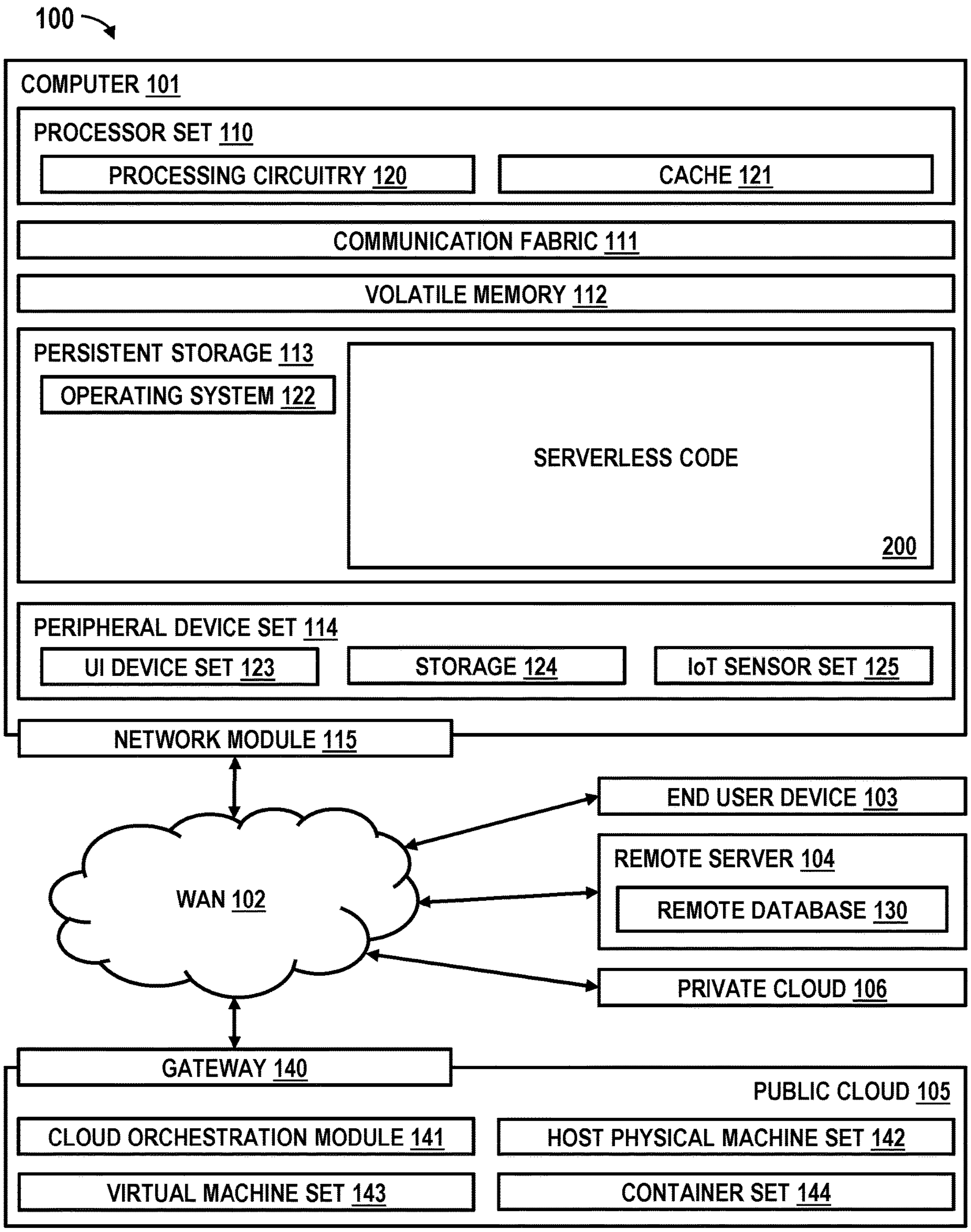
FIG. 1 depicts a computing environment according to an embodiment of the present invention.

Aspects of the present invention relate generally to serverless infrastructure and, more particularly, to serverless infrastructure efficiency improvement and reduced latency. Embodiments of the present invention use services to solve an auto-scale issue and use software to solve a scale-down-to-zero issue. In particular, the auto-scale issue occurs when it is difficult to scale multiple operations (e.g., schedule and dispatch resources, pull images, shut down, and perform cleanup) for a massive number of continual requests occurring during a busy period of a service. Further, the scale-down-to-zero issue occurs when services are essentially scaled down to a very light workload when there is no demand for requests. In this scenario, it is difficult to handle received requests when the services are essentially scaled down to a very light workload. Embodiments of the present invention run software on provisioned hosts in a cluster as a thread pool to respond quickly for instant requests when there is the scale-down-to-zero issue. Embodiments of the present invention also allow a user to run customized code as a service to leverage auto-scale technology to track and predict traffic and manage a number of service instances to respond to continuous requests.

Embodiments of the present invention reduce latency when service is scaled down to zero in comparison to conventional systems. Embodiments of the present invention reduce scheduling of image pull time and actual image pull time in comparison to conventional systems. Embodiments of the present invention provide a simplified architecture in comparison to conventional systems which must include an activator. Embodiments of the present invention provision and manage software hosts as a subset of a cluster. Embodiments of the present invention also build two separate images based on a same code.

Embodiments of the present invention provide a computer-implemented method, a system, and a computer program product for improving performance of a serverless infrastructure. In contrast, conventional systems take a long time to start, schedule, and pull images in a serverless environment. Further, although conventional systems may reduce latency by scaling down to zero when there are no requests, performance dramatically slows down when trying to auto-scale due to a massive number of continual requests occurring during a busy period of a service. Embodiments of the present invention provide improved latency by autoscaling during continuous requests and providing software hosts for instant requests. In embodiments, software hosts may correspond with a WebAssembly module.

Embodiments of the present invention include a highly computationally efficient system, method, and computer program product for providing an efficient serverless infrastructure and reduced latency. Accordingly, implementations of the present invention provide an improvement (i.e., technical solution) to a problem arising in the technical field of handling incoming requests in a serverless environment. In particular, embodiments of the present invention determine whether incoming requests are instant requests or continuous requests, utilize software hosts to service the instant requests, and utilize cluster hosts to service the continuous requests. In addition, implementations of the present invention reduce latency while servicing instant requests and continuous requests differently and provide a simplified architecture for managing all of the instant requests. Embodiments of the present invention also build two separate images based on a same code.

Implementations of the present invention are necessarily rooted in computer technology. For example, the steps of utilizing cluster hosts to service continuous requests and utilizing software hosts to service instant requests are computer-based and cannot be performed in the human mind.

Servicing continuous requests and instant requests by cluster hosts and software hosts, respectively are, by definition, performed by a computer and cannot practically be performed in the human mind (or with pen and paper) due to the complexity of servicing instant and continuous requests in real-time. Thus, it is simply not possible for the human mind, or for a person using pen and paper, to service instant and continuous requests by cluster hosts and software hosts, respectively, in real-time, in a serverless environment.

Aspects of the present invention include a method, system, and computer program product for improving a serverless infrastructure efficiency and reducing a latency. For example, a computer-implemented method includes: building two images based on a function code, the two images including a software module image and a long live service image; running a software host module to respond quickly for instant requests and scaling the host module to zero when there are no instant requests; providing a cluster of hosts for continuous requests; monitor a metric and spin up full services with the long live service image when a predetermined criteria is met; keep scaled up long live services running during a busy time to reduce scheduling an image and an image pull time; and scaling down to zero the long live services in response to the predetermined criteria being met.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as serverless code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
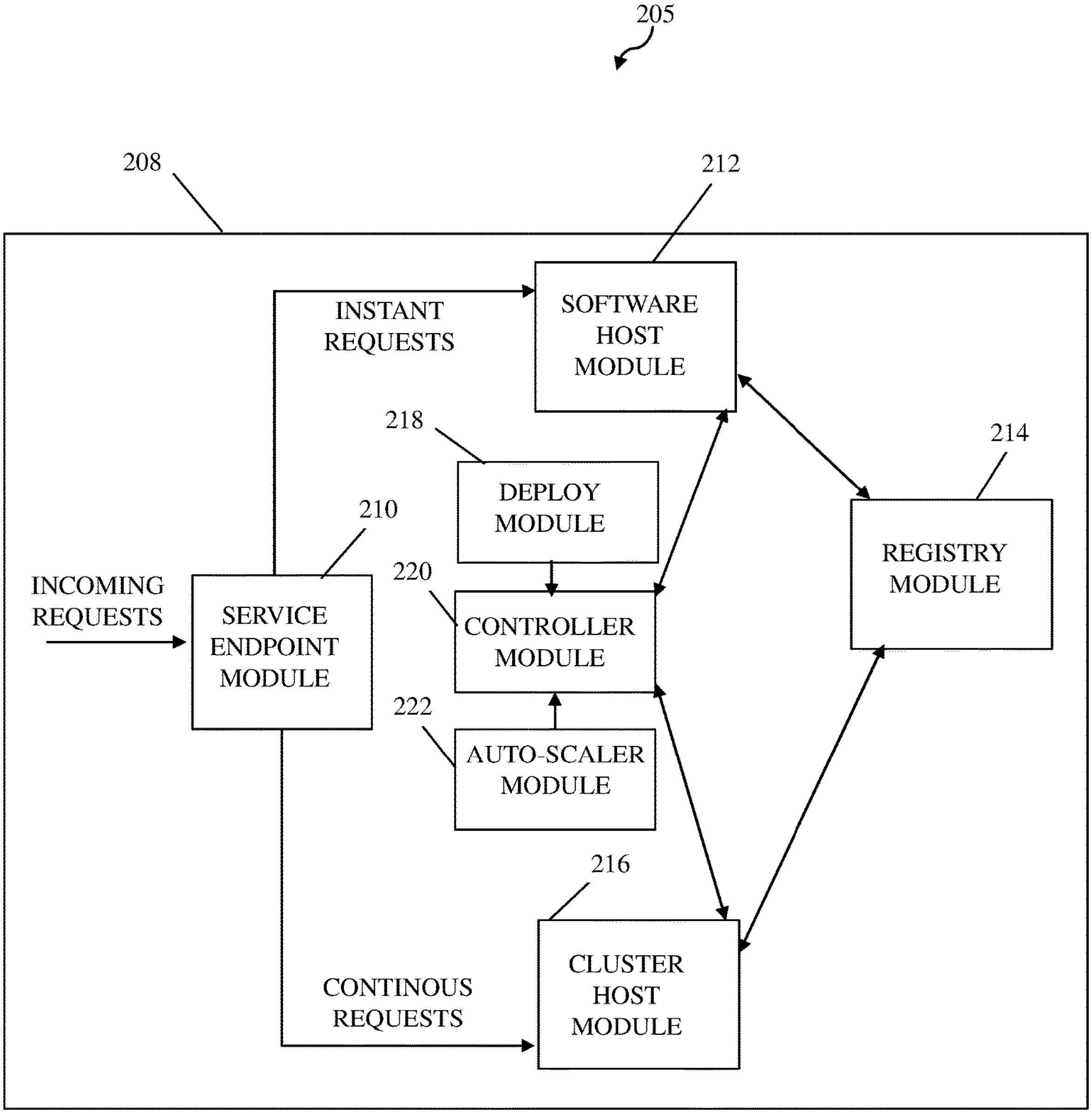
FIG. 2 shows a block diagram of an exemplary environment in accordance with aspects of the present invention.

FIG. 2 shows a block diagram of an exemplary environment 205 in accordance with aspects of the present invention. In embodiments, the environment 205 includes a serverless computing cluster 208, which may comprise one or more instances of the computer 101 of FIG. 1. In other examples, the serverless computing cluster 208 comprises one or more virtual machines or one or more containers running on one or more instances of the computer 101 of FIG. 1.

In embodiments, the serverless computing cluster 208 of FIG. 2 comprises a service endpoint module 210, a software host module 212, a registry module 214, a cluster host module 216, a deploy module 218, a controller module 220, and an auto-scaler module 222, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The serverless computing cluster 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, the service endpoint module 210 receives a plurality of incoming requests from a computing application within a computing device. In embodiments, the service endpoint module 210 analyzes the incoming requests and determines whether the incoming requests are instant requests or continuous requests. In embodiments, continuous requests are multiple requests being received one after another in a short predetermined period of time. In an example, continuous requests may be defined as greater than 100 continuous requests within a six second window. In contrast, instant request are received asynchronously and separated by a larger period of time (e.g., sixty seconds) than the short predetermined period of time. In embodiments, the service endpoint module 210 analyzes the incoming requests, determines that the incoming requests are instant requests, and sends the instant requests to the software host module 212. In other embodiments, the service endpoint module 210 analyzes the incoming requests, determines that the incoming requests are continuous requests, and sends the continuous requests to the cluster host module 216. In embodiments, the software host module 212 comprises a WebAssembly host and at least one cluster host of the cluster host module 216 is provisioned with a WebAssembly host with WebAssembly support.

In FIG. 2, and in accordance with aspects of the present invention, the deploy module 218 creates a scheduled policy as part of a deployed configuration and sends the deployed configuration to the controller module 220. In embodiments, the scheduled policy includes a policy of scaling down when there are no instant requests. In embodiments, the auto-scaler module 222 monitors service metrics and an auto-scale service instance. In other embodiments, the auto-scale service instance provides instructions to the controller module 220 for converting the continuous requests to service instances and pulling and running a service image. In embodiments, the auto-scaler module 222 also provides instructions to the controller module 220 to scale down the service instances in response to no massive amount of continuous requests being received at the cluster host module 216 (e.g., an amount below or equal to a predetermined amount of continuous requests). In other embodiments, the auto-scaler module 222 provides instructions to the controller module 220 to scale up the service instances in response to a massive amount of continuous requests being received at the cluster host module 216 (e.g., an amount above the predetermined amount of continuous requests).

In FIG. 2, and in accordance with aspects of the present invention, the software host module 212 receives the instant requests from the service endpoint module 210 and the deployed configuration including the scheduled policy from the controller module 220. The software host module 212 then creates a software image based on the instant requests from the service endpoint module 210 and the deployed configuration including the scheduled policy from the controller module 220. The registry module 214 then pulls the software image based on the deployed configuration including the scheduled policy. In embodiments, the software image comprises a WebAssembly image. However, embodiments are not limited to this example, and may include other images corresponding with C++, Java™, etc. Java is a registered trademark of Oracle.

In FIG. 2, and in accordance with aspects of the present invention, the software host module 212 can also be used during a software program build. For example, the software host module 212 receives a target build and determine whether the target build is built to a predetermined software (e.g., WebAssembly). The software host module 212 then determines whether the target build is part of a package in response to determining that the target build is built to the predetermined software. The software host module 212 provides a predetermined service wrapper (e.g., WebAssembly service wrapper) to the package for creating a software image in response to determining that the target build is part of a package. The software host module 212 then pushes the software image to the registry module 214. Alternatively, if the software host module 212 determines that the target build is not part of the package, the software host module 212 directly creates the software image as the target build and pushes the software image to the registry module 212

In FIG. 2, and in accordance with aspects of the present invention, the software host module 212 determines whether the target build is a native build in response to determining that the target build is not built to the predetermined software. In embodiments, the native build occurs when a user adds template code within the target build. The template code may be written in any programming language, such as WebAssembly, C++, Java™, etc. The software host module 212 provides the predetermined service wrapper to the target build for creating a software image in response to determining that the target build is not the native build. The software host module 212 then pushes the software image to the registry module 214. Alternatively, if the software host module 212 determines that the target build is the native build, the process for the software host module 212 ends without creating a software image.

In FIG. 2, and in accordance with aspects of the present invention, the cluster host module 216 includes a plurality of hosts which are configured to receive the continuous requests from the service endpoint module 210. The cluster host module 216 is also configured to receive an instruction for converting the continuous requests to service instances and pulling and running a service image and one instruction of scaling up the service instances or scaling down the service instances from the controller module 220. The cluster host module 216 then either scales up or down based on the one instruction of scaling up or scaling down the service instances from the controller module 220. The cluster host module 216 also creates a service image based on the continuous requests from the service endpoint module

210 and the instruction for converting the continuous requests to service instances and pulling and running the service image from the controller module 220. The registry module 214 then pulls the service image based on the instruction of pulling and running the service image.

In FIG. 2, and in accordance with aspects of the present invention, the cluster host module 216 can also be used during the software program build. For example, the cluster host module 216 receives the target build and determines whether the target build is built to the predetermined software (e.g., WebAssembly). The cluster host module 216 then determines whether the target build is built to a native build in response to determining that the target build is not built to the predetermined software. As discussed above, the native build occurs when the user adds template code within the target build. The cluster host module 216 builds a service image from the target build in response to determining that the target build is built to the native build. The cluster host module 216 then pushes the service image to the registry module 214. Alternatively, if the cluster host module 216 determines that the target build is built to the predetermined software, the process for the cluster host module 216 ends without creating a service image. Also, if the cluster host module 216 determines that the target build is not built to the native build, the process for the cluster host module 216 ends without creating the service image.

Figure 3:
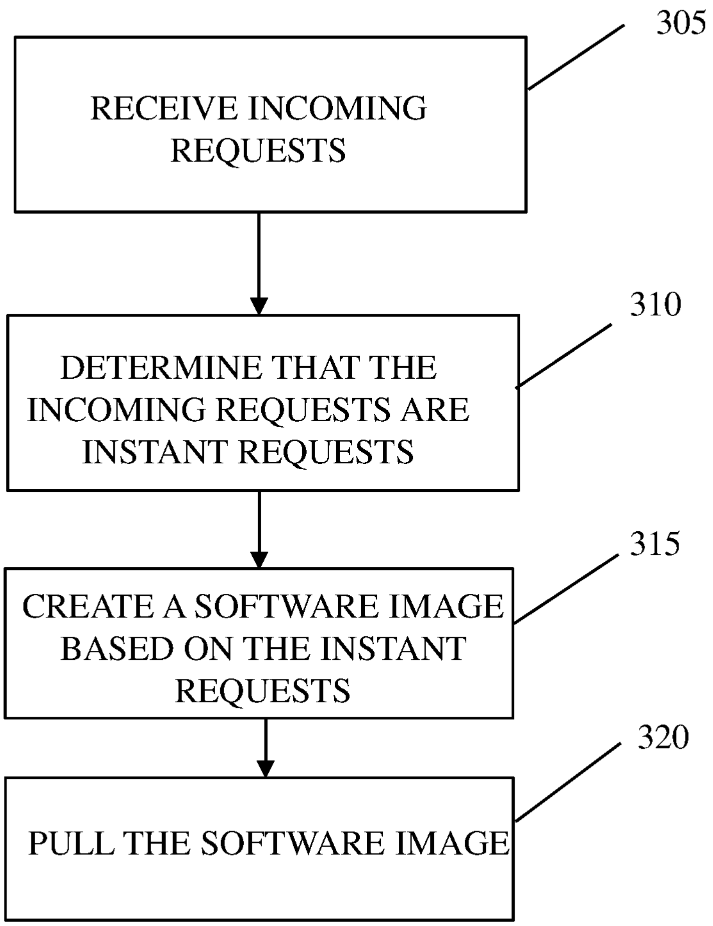
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

In embodiments of FIG. 3, at step 305, the system receives, at the service endpoint module 210, incoming requests. In embodiments and as described with respect to FIG. 2, the service endpoint module receives the incoming requests, analyzes the incoming requests, and determines whether the incoming requests are instant requests or continuous requests.

At step 310, the system determines, at the service endpoint module 210, that the incoming requests are instant requests. In embodiments and as described with respect to FIG. 2, the service endpoint module 210 sends the instant requests to the software host module 212.

At step 315, the system creates, at the software host module 212, a software image based on the instant requests. In embodiments and as described with respect to FIG. 2, the software host module 212 creates the software image based on the instant requests and a deployed configuration including a scheduled policy from a controller module 220.

At step 320, the system pulls, at the registry module 214, the software image from the software host module 212. In embodiments and as described with respect to FIG. 2, the registry module 214 pulls the software image based on the deployed configuration including the scheduled policy.

Figure 4:
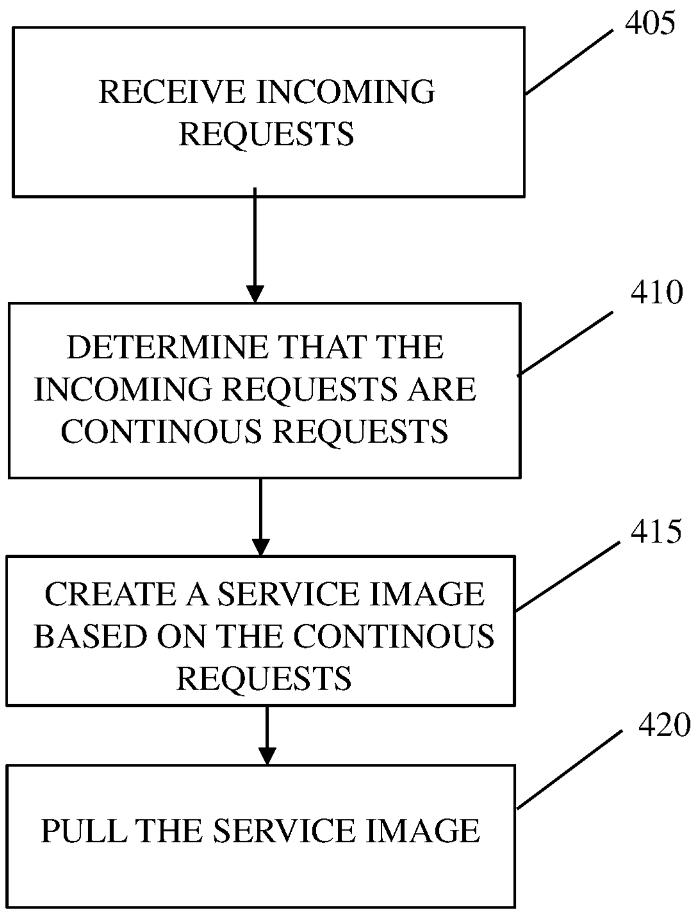
FIG. 4 shows a flowchart of another exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

In embodiments of FIG. 4, at step 405, the system receives, at the service endpoint module 210, incoming requests. In embodiments and as described with respect to FIG. 2, the service endpoint module receives the incoming requests, analyzes the incoming requests, and determines whether the incoming requests are instant requests or continuous requests.

At step 410, the system determines, at the service endpoint module 210, that the incoming requests are continuous requests. In embodiments and as described with respect to FIG. 2, the service endpoint module 210 sends the continuous requests to the cluster host module 216.

At step 415, the system creates, at the cluster host module 216, a service image based on the continuous requests. In embodiments and as described with respect to FIG. 2, the cluster host module 216 creates the service image based on the continuous requests and an instruction for converting the continuous requests to service instances and pulling and running the service image and one instruction of scaling up the service instances or scaling down the service instances from the controller module 220.

At step 420, the system pulls, at the registry module 214, the service image from the cluster host module 216. In embodiments and as described with respect to FIG. 2, the registry module 214 pulls the service image based on the instruction of pulling and running the service image.

Figure 5:
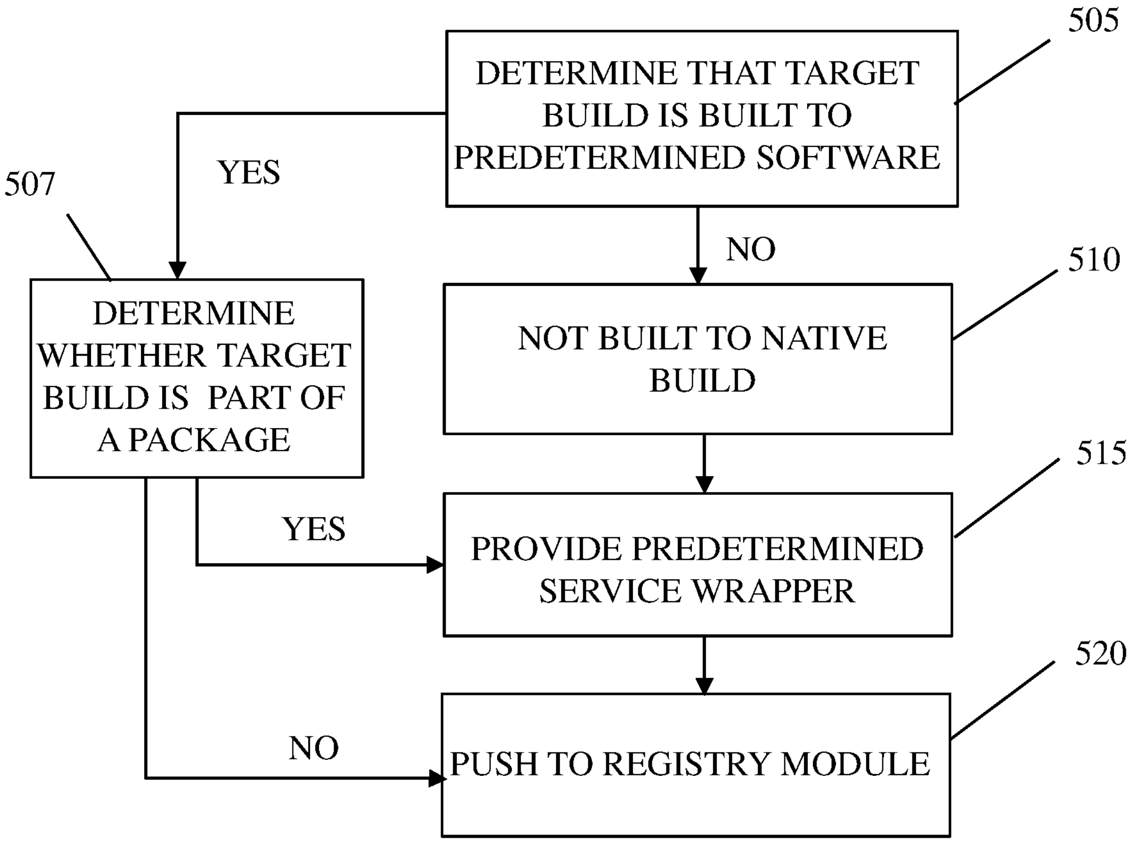
FIG. 5 shows a flowchart of another exemplary method in accordance with aspects of the present invention.

FIG. 5 shows a flowchart of an exemplary method in accordance with aspects of the present invention. Steps of the method may be carried out in the environment of FIG. 2 and are described with reference to elements depicted in FIG. 2.

In embodiments of FIG. 5, at step 505, the system determines, at the software host module 212, that a target build is built to predetermined software (e.g., WebAssembly). At step 507, the system determines, as the software host module 212, whether the target build is part of a package in response to determining that the target build is built to the predetermined software. At step 515, the system provides, at the software host module 212, a predetermined service wrapper (e.g., WebAssembly service wrapper) to the package for creating a software image in response to a determination that the target build is part of the package. At step 520, the system pushes, at the software host module 212, the software image to the registry module 214. Alternatively, at step 520, the system pushes, at the software host module 212, the software image as the target build to the registry module 214 in response to determining that the target build is not part of a package.

In further embodiments of FIG. 5, at step 510, the system determines, at the software host module 212, that the target build is not built to a native build in response to determining that the target build is not built to the predetermined software. In embodiments, the native build occurs when the user adds template code within the target build. At step 515, the system provides, at the software host module 212, a predetermined service wrapper to the target build for creating a software image in response to determining that the target build is not the native build. At step 520, the system pushes, at the software host module 212, the software image to the registry module 214.

Figure 6:
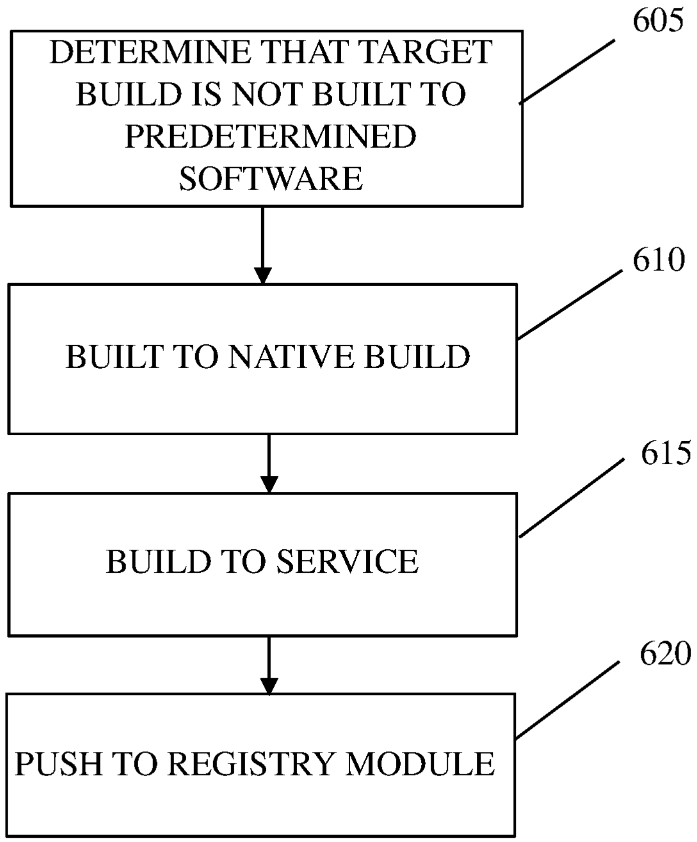
FIG. 6 shows a flowchart of another exemplary method in accordance with aspects of the present invention.

FIG. 6 shows a flowchart of an exemplary method in accordance with aspects of the present invention. Steps of the method may be carried out in the environment of FIG. 2 and are described with reference to elements depicted in FIG. 2.

In embodiments of FIG. 6, at step 605, the system determines, at the cluster host module 216, that a target build is not built to predetermined software (e.g., WebAssembly). At step 610, the system determines, at the cluster host module 216, that the target build is built to a native build. In embodiments, the native build occurs when the user adds template code within the target build. At step 615, the system builds, at the cluster host module 216, a service image from the target build in response to a determination that the target build is built to the native build. At step 620, the system pushes, at the cluster host module 216, the service image to the registry module 214.

Figure 7:
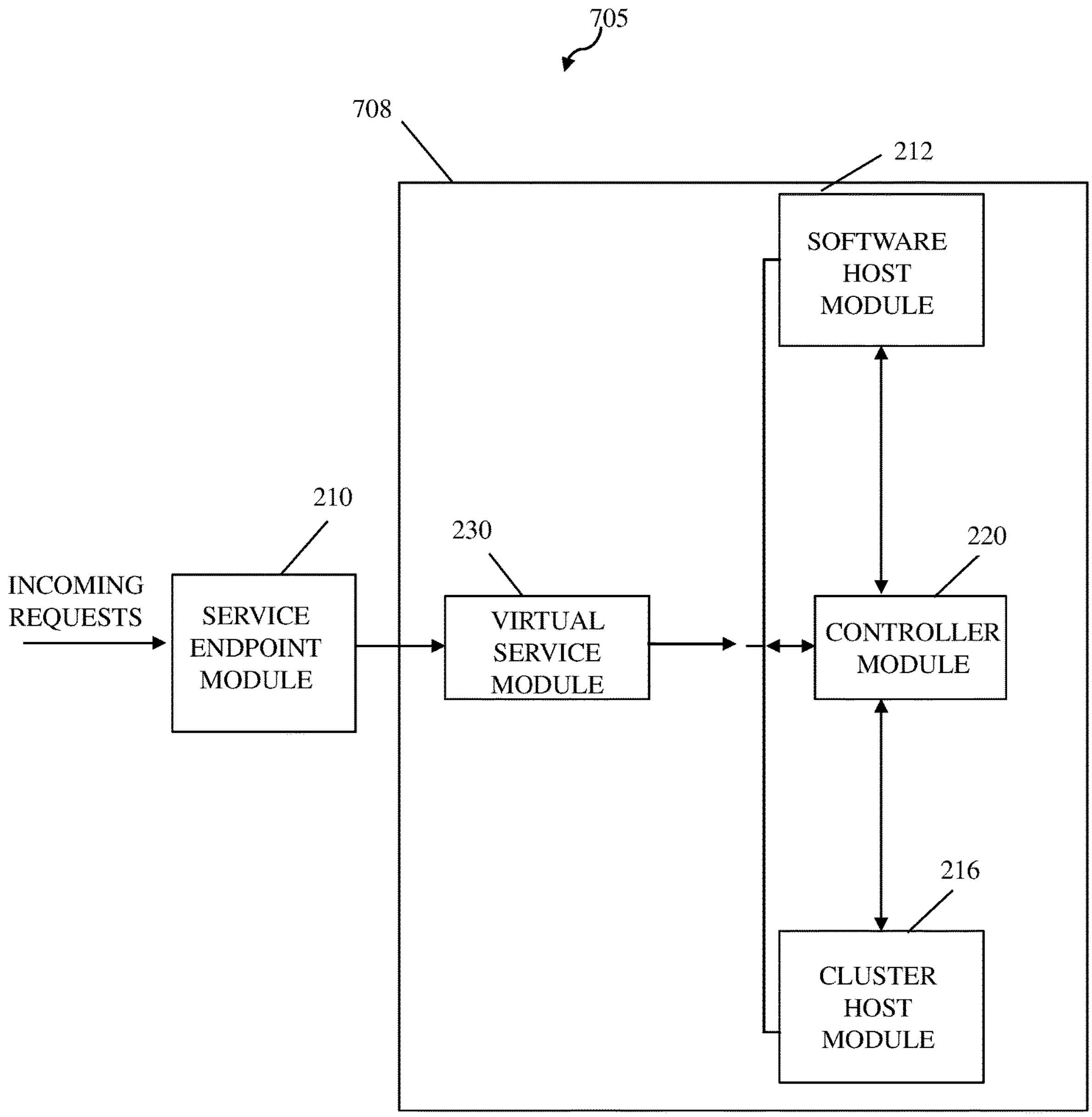
FIG. 7 shows a block diagram of another exemplary environment in accordance with aspects of the present invention.

FIG. 7 shows a block diagram of an exemplary environment 705 in accordance with aspects of the present invention. In embodiments, the environment 705 includes another serverless computing cluster 708, which may comprise one or more instances of the computer 101 of FIG. 1. In other examples, the another serverless computing cluster 708 comprises one or more virtual machines or one or more containers running on one or more instances of the computer 101 of FIG. 1.

In embodiments, the another serverless computing cluster 708 of FIG. 7 comprises the software host module 212, the cluster host module 216, the controller module 220, and a virtual service module 230, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The another serverless computing cluster 708 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 7, and in accordance with aspects of the present invention, the service endpoint module 210 receives a plurality of incoming requests. In embodiments, the service endpoint module 210 sends the incoming requests to the virtual service module 230. The virtual service module 230 determines whether the incoming requests are instant requests or continuous requests. In embodiments, the virtual service module 230 analyzes the incoming requests, determines that the incoming requests are instant requests, and sends the instant requests to the software host module 212. In other embodiments, the virtual service module 230 analyzes the incoming requests, determines that the incoming requests are continuous requests, and sends the continuous requests to the cluster host module 216. In embodiments, the software host module 212 comprises a WebAssembly host and at least one cluster host of the cluster host module 216 is provisioned with a WebAssembly host with WebAssembly support. In FIG. 7, the software host module 212, the cluster host module 216, and the virtual service module 230 are managed by the controller module 220.

In embodiments of FIG. 7, a customer access service occurs through the service endpoint module 210. Further, in embodiments, the service endpoint module 210 is directed to the software host module 212 or the cluster host module 216 through the virtual service module 230. In embodiments, the virtual service module 230 also includes features that are similar to the features included in the deploy module 218 and the auto-scaler module 222. In embodiments, the software host module 212 has a plurality of functions which are deployed during a service creation. In further embodiments, the cluster host module 216 has a service which is scaled up or scaled down by an auto-scaler.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, a plurality of incoming requests;

determining, by the processor set, that the plurality of incoming requests comprise a plurality of instant requests;

creating, by the processor set, a software image based on the plurality of instant requests, wherein creating the software image comprises:

determining whether a target build corresponding to the plurality of instant requests is built to a predetermined format;

in response to determining that the target build is built to the predetermined format, determining whether the target build is associated with a package; and in response to determining that the target build is associated with the package, creating the software image using a predetermined service wrapper; and pulling, by the processor set, the software image based on a deployed configuration.

2. The computer-implemented method of claim 1, wherein the deployed configuration includes a scheduled policy.

3. The computer-implemented method of claim 2, wherein the scheduled policy comprises a policy of scaling down when there are no instant requests.

4. The computer-implemented method of claim 1, wherein the software image comprises a WebAssembly image.

5. The computer-implemented method of claim 1, further comprising determining that the plurality of incoming request comprise a plurality of continuous requests.

6. The computer-implemented method of claim 5, further comprising creating a service image based on the continuous requests.

7. The computer-implemented method of claim 5, further comprising scaling up based on an instruction of scaling up the continuous requests.

8. The computer-implemented method of claim 5, further comprising scaling down based on an instruction of scaling down the continuous requests.

9. The computer-implemented method of claim 6, further comprising pulling the service image based on an instruction of pulling and running the service image.

10. A computer program product comprising one or more computer readable storage media having program instructions collectively stored on the one or more computer readable storage media, the program instructions executable to:

receive a plurality of incoming requests;

determine that the plurality of incoming requests comprise a plurality of continuous requests;

create a service image based on the plurality of continuous requests, wherein creating the service image comprises:

determining whether a target build corresponding to the plurality of continuous requests is built to a predetermined format;

in response to determining that the target build is not built to the predetermined format, determining whether the target build corresponds to a native build; and creating the service image in response to determining that the target build is built to the native build; and pull the service image based on an instruction of pulling and running the service image.

11. The computer program product of claim 10, further comprising scaling up based on an instruction of scaling up the continuous requests.

12. The computer program product of claim 10, further comprising scaling down based on an instruction of scaling down the continuous requests.

13. The computer program product of claim 10, further comprising determining that the plurality of incoming requests comprise a plurality of instant requests.

14. The computer program product of claim 13, further comprising creating a software image based on the instant requests.

15. The computer program product of claim 14, further comprising pulling the software image based on a deployed configuration.

16. The computer program product of claim 15, wherein the deployed configuration includes a scheduled policy.

17. The computer program product of claim 16, wherein the scheduled policy comprises a policy of scaling down when there are no instant requests.

18. A system comprising:

a processor set, one or more computer readable storage media, and program instructions collectively stored on the one or more computer readable storage media, the program instructions executable to:

receive a plurality of incoming requests;

determine that the plurality of incoming requests comprise a plurality of instant requests;

create a software image based on the plurality of instant requests, wherein to create the software image, the processor is configured to:

determine whether a target build corresponding to the plurality of instant requests is built to a predetermined format;

in response to determining that the target build is built to the predetermined format, determine whether the target build is associated with a package; and in response to determining that the target build is associated with the package, create the software image using a predetermined service wrapper; and pull the software image based on a deployed configuration.

19. The system of claim 18, wherein the deployed configuration includes a scheduled policy.

20. The system of claim 19, wherein the scheduled policy comprises a policy of scaling down when there are no instant requests.

* * * * *